(12) United States Patent
Bae et al.

(10) Patent No.: US 10,468,918 B2
(45) Date of Patent: Nov. 5, 2019

(54) RECEIVING ANTENNA AND WIRELESS POWER RECEIVING DEVICE INCLUDING THE SAME

(71) Applicant: LG INNOTEK CO., LTD., Seoul (KR)

(72) Inventors: Seok Bae, Seoul (KR); Donchul Choi, Seoul (KR); Soon Young Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/974,866

(22) Filed: May 9, 2018

(65) Prior Publication Data

US 2018/0287433 A1    Oct. 4, 2018

Related U.S. Application Data

(63) Continuation of application No. 14/901,426, filed as application No. PCT/KR2014/005258 on Jun. 16, 2014, now Pat. No. 9,997,962.

(30) Foreign Application Priority Data

Jun. 27, 2013  (KR) .......................... 10-2013-0074620

(51) Int. Cl.
*H02J 50/70*    (2016.01)
*H02J 50/10*    (2016.01)
(Continued)

(52) U.S. Cl.
CPC ............ *H02J 50/70* (2016.02); *H01Q 7/06* (2013.01); *H02J 7/025* (2013.01); *H02J 50/10* (2016.02);
(Continued)

(58) Field of Classification Search
CPC .. H02J 50/70; H02J 50/10; H02J 50/27; H02J 50/20; H02J 7/025; H01Q 7/06; H04B 5/0037
(Continued)

(56) References Cited

U.S. PATENT DOCUMENTS 5,412,265 A * 5/1995 Sickafus ................. H02K 3/26
                                                                310/179
5,940,362 A * 8/1999 Plonsky ............. G08B 13/2408
                                                                369/273
(Continued)

FOREIGN PATENT DOCUMENTS

CN    102598168    7/2012
CN    103094992    5/2013
(Continued)

OTHER PUBLICATIONS

European Search Report dated Jul. 12, 2016 issued in Application No. 14817626.6.
(Continued)

*Primary Examiner* — M Baye Diao
(74) *Attorney, Agent, or Firm* — Ked & Associates, LLP

(57) ABSTRACT

A receiving antenna of a wireless power receiving device wirelessly charging electric power according to an embodiment of the present invention includes a substrate, a soft magnetic layer stacked on the substrate, and a receiving coil configured to receive electromagnetic energy emitted from a wireless power transmission device, wound in parallel with a plane of the soft magnetic layer, and formed inside of the soft magnetic layer, and an insulating layer is formed between the soft magnetic layer and the receiving coil.

19 Claims, 7 Drawing Sheets

(51) Int. Cl.
*H01Q 7/06* (2006.01)
*H02J 7/02* (2016.01)
*H02J 50/20* (2016.01)
*H02J 50/27* (2016.01)
*H04B 5/00* (2006.01)

(52) U.S. Cl.
CPC .............. *H02J 50/20* (2016.02); *H02J 50/27* (2016.02); *H04B 5/0037* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 6,351,042 | B1* | 2/2002 | Takayanagi | H02K 1/187 29/596 |
| 6,366,084 | B1* | 4/2002 | Otsuki | G01R 33/02 324/249 |
| 9,362,776 | B2* | 6/2016 | Low | G04C 10/00 |
| 9,504,194 | B2* | 11/2016 | Lee | H01F 38/14 |
| 9,997,950 | B2* | 6/2018 | Bae | H01Q 7/00 |
| 2005/0226136 | A1* | 10/2005 | Moribe | G11B 11/10591 369/275.4 |
| 2006/0262593 | A1* | 11/2006 | Aouba | G11C 11/18 365/158 |
| 2007/0241201 | A1* | 10/2007 | Brown | G06Q 20/26 235/493 |
| 2009/0121677 | A1 | 5/2009 | Inoue et al. | |
| 2010/0007215 | A1 | 1/2010 | Sakuma | |
| 2010/0052992 | A1 | 3/2010 | Okamura et al. | |
| 2011/0050382 | A1 | 3/2011 | Baarman et al. | |
| 2013/0069444 | A1* | 3/2013 | Waffenschmidt | H01F 38/14 307/104 |
| 2013/0169399 | A1* | 7/2013 | Yoo | H01F 17/0013 336/180 |

FOREIGN PATENT DOCUMENTS

| | | |
|---|---|---|
| EP | 2 096 711 | 9/2009 |
| JP | 2007-503715 | 2/2007 |
| JP | 2008-288370 | 11/2008 |
| KR | 10-2010-0111409 | 10/2010 |
| KR | 10-2011-124695 | 11/2011 |
| KR | 10-2012-0057636 | 6/2012 |
| KR | 10-1177302 | 8/2012 |
| KR | 10-2013-0021791 | 3/2013 |
| TW | 2007-23596 | 6/2007 |
| WO | WO 2011/031473 | 3/2011 |

OTHER PUBLICATIONS

International Search Report dated Sep. 18, 2014 issued in Application No. PCT/KR2014/005258.
U.S. Office Action dated Sep. 22, 2017 issued in co-pending U.S. Appl. No. 14/901,426.
Chinese Office Action dated Nov. 29, 2017 issued in Application No. 201480037192.1 (English translation attached).
Korean Office Action dated Jun. 18, 2018 issued in Application No. 10-2013-0074620.

* cited by examiner (a) COMPARATIVE EXAMPLE (b) EXAMPLE 1

(c) EXAMPLE 2

(d) EXAMPLE 3

RECEIVING ANTENNA AND WIRELESS POWER RECEIVING DEVICE INCLUDING THE SAME

This application is a Continuation Application of U.S. patent application Ser. No. 14/901,426 filed Dec. 28, 2015, which is a U.S. National Stage Application under 35 U.S.C. § 371 of PCT Application No. PCT/KR2014/005258, filed Jun. 16, 2014, which claims priority to Korean Patent Application No. 10-2013-0074620, filed Jun. 27, 2013, whose entire disclosures are hereby incorporated by reference.

TECHNICAL FIELD

The present invention relates to wireless charging, and more particularly, to a receiving antenna for wireless charging and a wireless power receiving device including the same.

BACKGROUND ART

According to the development of wireless communication technology, interest in wireless power transceiving technology which provides electric power to electronic devices wirelessly is increasing. The wireless power transceiving technology may be diversely applied to a power supply for household electronic products and for electric cars or subway trains, as well as battery charging of portable terminals.

General wireless power transceiving technology uses a principle of magnetic induction or magnetic resonance. For example, when electrical energy is applied to a transmission antenna of a wireless power transmission device, the transmission antenna may convert the electrical energy into electromagnetic energy and emit the electromagnetic energy to the surroundings. And a receiving antenna of a wireless power receiving device may receive the electromagnetic energy emitted from the transmission antenna and convert it to the electrical energy.

In that case, it is necessary to minimize an energy loss between the wireless power transmission device and the wireless power receiving device to increase power transceiving efficiency. For this, the transmission antenna and the receiving antenna may need to be mutually arranged within an effective distance. Further, a soft magnetic material may be disposed around the transmission antenna and the receiving antenna to focus the electromagnetic energy emitted from the transmission antenna toward the receiving antenna.

For this, a receiving coil is formed on a soft magnetic layer. In that case, an air layer is formed between the receiving coil and the soft magnetic layer, and therefore there may be a problem that guiding effect of a magnetic field of the soft magnetic layer is reduced.

DISCLOSURE

Technical Problem

The present invention aims to provide a structure of a receiving antenna capable of improving a wireless power receiving efficiency of a wireless power receiving device.

Technical Solution

According to an embodiment of the present invention, a receiving antenna of a wireless power receiving device wirelessly charging electric power includes a substrate, and a soft magnetic layer stacked on the substrate, and a receiving coil wound in parallel with a plane of the soft magnetic layer and formed inside of the soft magnetic layer. An insulating layer is formed between the soft magnetic layer and the receiving coil.

The receiving antenna may further include a first adhesive layer formed between the soft magnetic layer and the insulating layer, and a second adhesive layer formed between the insulating layer and the receiving coil.

The insulating layer may include a poly ethylene terephthalate (PET) material.

The soft magnetic layer may include a plurality of stacked sheets including a soft magnetic metal powder and a polymer resin.

The soft magnetic layer may include a groove portion.

The receiving antenna may further include a support means stacked on the receiving coil.

According to another embodiment of the present invention, a method of fabricating a receiving antenna includes stacking a plurality of sheets including a soft magnetic metal powder and a polymer resin, forming an insulating layer on an upper plane of the plurality of sheets, disposing a receiving coil on the insulating layer, and compressing the plurality of sheets, the insulating layer, and the receiving coil to form the receiving coil inside of the plurality of sheets.

According to still another embodiment of the present invention, a wireless power receiving device wirelessly charging electric power includes a substrate, a soft magnetic layer stacked on the substrate, a receiving coil wound in parallel with a plane of the soft magnetic layer, and formed inside of the soft magnetic layer, a circuit unit connected to the receiving coil, and converting electromagnetic energy into electrical energy, and a storage unit for storing the electrical energy. An insulating layer is formed between the soft magnetic layer and the receiving coil.

Advantageous Effects

According to embodiments of the present invention, the performance of electromagnetic energy focusing of a receiving antenna in a wireless power receiving device can be increased, and therefore wireless power transceiving efficiency can be maximized. Particularly, an air layer between a receiving coil and a soft magnetic layer is removed, and therefore guiding effect of a magnetic field of the soft magnetic layer becomes high, and an improved power transmission efficiency can be obtained by decreasing a thickness of the receiving antenna and decreasing a distance between a transmission antenna and the receiving antenna.

Accordingly, an electromagnetic energy focusing effect of a required standard even with a thin thickness can be obtained, and therefore the present invention can be applied to various electronic devices of the slimness trend such as a TV, a portable terminal, a notebook, a tablet PC, etc.

Further, the wireless power receiving device according to the embodiments of the present invention has an excellent electromagnetic energy focusing performance and can use inexpensive materials, and therefore, can be applied to a large application field such as electric cars, subway trains, etc.

Further, the probability of an electrical short between the soft magnetic layer and the receiving coil is reduced, and therefore reliability of the receiving antenna may be improved.

MODE FOR INVENTION

Figure 1:
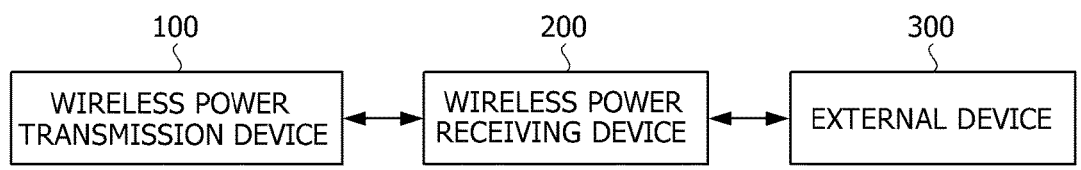
FIG. 1 is a block diagram illustrating a wireless power transceiver system in accordance with an embodiment of the present invention.

While the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept.

It will be understood that, although the terms "first," "second," etc. may be used herein to describe various components, these components should not be limited by these terms. These terms are only used to distinguish one component from another component. Thus, a first component discussed below could be termed a second component and the second component discussed below could be termed the first component without departing from the teachings of the present inventive concept. The "and/or" includes each and all combinations of one or more of the items mentioned.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the inventive concept is not intended to limit the scope of the inventive concept. Elements of the inventive concept referred to in the singular may number one or more, unless the context clearly indicates otherwise. It will be further understood that the terms "comprise", "have", etc. when used herein, specify the presence of stated features, numbers, steps, operations, elements, components, and/or groups thereof, but do not preclude the presence or addition of one or more other features, numbers, steps, operations, elements, components, and/or groups thereof.

Unless otherwise defined, all terms (including technical and scientific terms) used herein are to be interpreted as is customary in the art to which this inventive concept belongs. It will be further understood that terms in common usage should also be interpreted as is customary in the relevant art and not in an idealized or overly formal sense unless expressly so defined herein.

Hereinafter, example embodiments are described with reference to the attached drawings, and same or corresponding elements regardless of drawing symbols will be given the same reference numbers, and overlapping descriptions will be omitted.

FIG. 1 is a block diagram illustrating a wireless power transceiver system in accordance with an embodiment of the present invention.

Referring to FIG. 1, the wireless power transceiver system may include a wireless power transmission device 100 and a wireless power receiving device 200. The wireless power transmission device 100 connected to a power supply applies electrical energy to a transmission antenna, and the transmission antenna converts the electrical energy into electromagnetic energy and emits the electromagnetic energy to the surroundings. The wireless power receiving device 200 receives the electromagnetic energy emitted from the transmission antenna using a receiving antenna, converts the electromagnetic energy into the electrical energy, and performs charging.

Here, the wireless power transmission device 100 may be, for example, a transmission pad. Further, the wireless power receiving device 200 may be a part of a structure of a portable terminal, household/personal electronic products, a transportation means, etc to which wireless power transceiving technology is applied. The portable terminal, household/personal electronic products, a transportation means, etc. to which the wireless power transceiving technology is applied may be set to include only the wireless power receiving device 200, or to include both the wireless power transmission device 100 and the wireless power receiving device 200.

Here, the wireless power transmission device 100 may transmit electric power using an electromagnetic induction method or a resonance method. Similarly, the wireless power receiving device 200 may receive the electric power using the electromagnetic induction method or the resonance method.

Meanwhile, the wireless power receiving device 200 may include a module which simultaneously has a wireless power conversion (WPC) function and a near field communication (NFC) function. Here, the wireless power receiving device 200 may perform NFC with an external device 300 including an NFC module.

Figure 2:
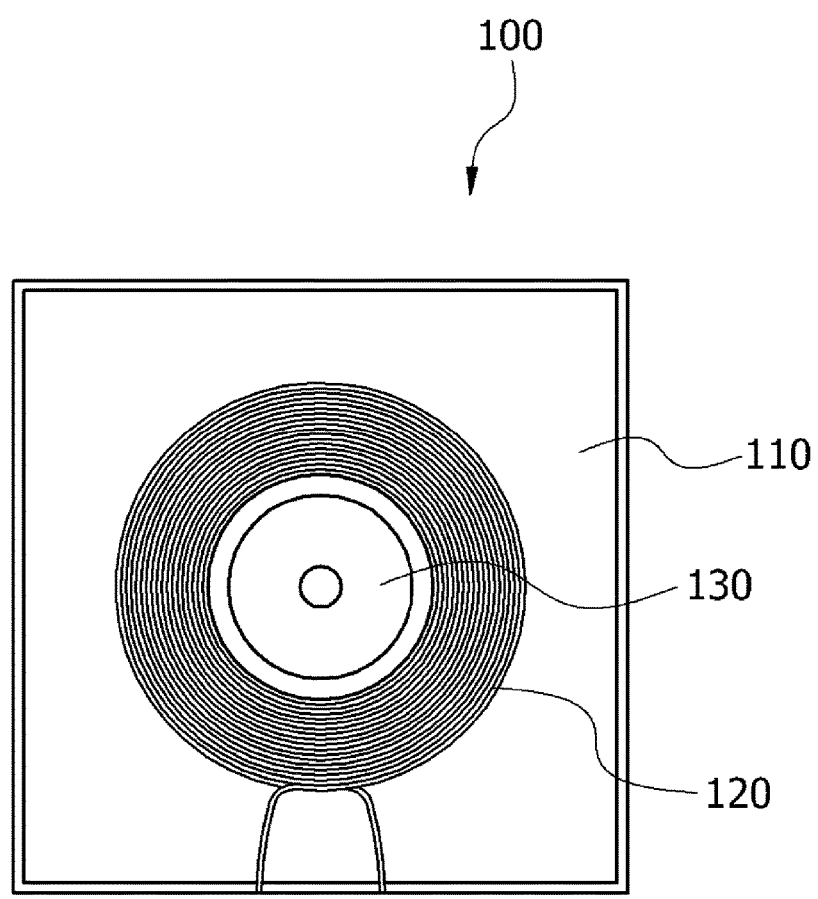
FIG. 2 is a diagram illustrating a part of a wireless power transmission device.
Figure 3:
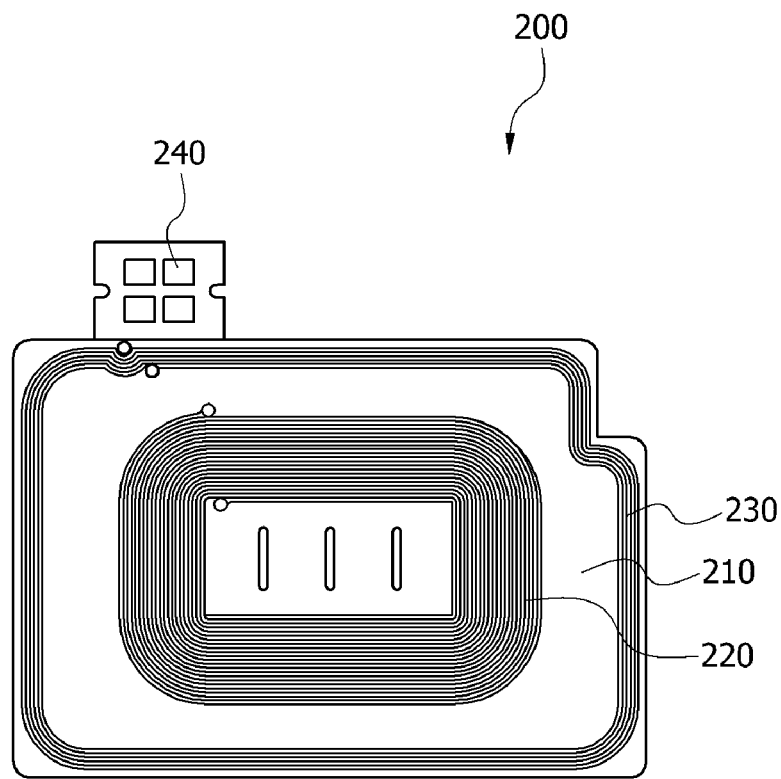
FIG. 3 is a diagram illustrating a part of a wireless power receiving device.

FIG. 2 is a diagram illustrating a part of a wireless power transmission device, and FIG. 3 is a diagram illustrating a part of a wireless power receiving device.

Referring to FIG. 2, the wireless power transmission device 100 may include a transmitting circuit (not shown), a soft magnetic core 110, a transmitting antenna 120, and a permanent magnet 130.

The soft magnetic core 110 may include a soft magnetic material having a thickness of several mms. Further, the transmitting antenna 120 consists of a transmitting coil, and the permanent magnet 130 may be surrounded by the transmitting antenna 120. Here, the permanent magnet 130 is not an essential element and may be omitted according to specifications.

Referring to FIG. 3, the wireless power receiving device 200 may include a receiving circuit (not shown), a soft magnetic layer 210, and a receiving coil 220. The soft magnetic layer 210 may be formed on a substrate (not shown). The substrate may include many layers of fixed sheets, and may be connected to the soft magnetic layer 210 to fix the soft magnetic layer 210.

The soft magnetic layer 210 focuses the electromagnetic energy emitted from the transmitting antenna 120 of the wireless power transmission device 100.

The soft magnetic layer 210 may include a metallic material or a ferrite material, and may be implemented in various forms of a pellet, a plate, a ribbon, foil, a film, etc. In an example embodiment, the soft magnetic layer 210 may be a form in which a plurality of sheets including a single metal or an alloy powder having soft magnetism (hereinafter, referred to as a soft magnetic metallic powder) and a polymer resin are stacked. In another example embodiment, the soft magnetic layer 210 may be an alloy ribbon, a stacked ribbon, foil, or a film including at least one of Fe, Co, and Ni. In still another example embodiment, the soft magnetic layer 210 may be a composite including 90 wt % or more of FeSiCr flakes and 10 wt % or less of a polymer resin. In yet another example embodiment, the soft magnetic layer 210 may be a sheet, a ribbon, foil, or a film including nickel-zinc (Ni—Zn) ferrite.

The receiving coil 220 may be stacked on the soft magnetic layer 210. The receiving coil 220 may be wound in a direction parallel to a plane of the soft magnetic layer 210 on the soft magnetic layer 210. For example, a receiving antenna applied to a smart phone may have a form of a spiral coil which has an outer diameter of no more than 50 mm and an inner diameter of 20 mm or greater. The receiving circuit converts the electromagnetic energy received through the receiving coil 220 into the electrical energy, and charges a battery (not shown) with the converted electrical energy.

Although not shown, a heat dissipation layer may be further included between the soft magnetic layer 210 and the receiving coil 220. In this specification, the soft magnetic layer 210 and the receiving coil 220 together may be referred to as the receiving antenna.

When the wireless power receiving device 200 simultaneously has the WPC function and the NFC function, an NFC coil 230 may be further stacked on the soft magnetic layer 210. The NFC coil 230 may be formed to surround an outer portion of the receiving coil 220.

Further, the receiving coil 220 and the NFC coil 230 may be electrically connected to each other through a terminal 240.

Figure 4:
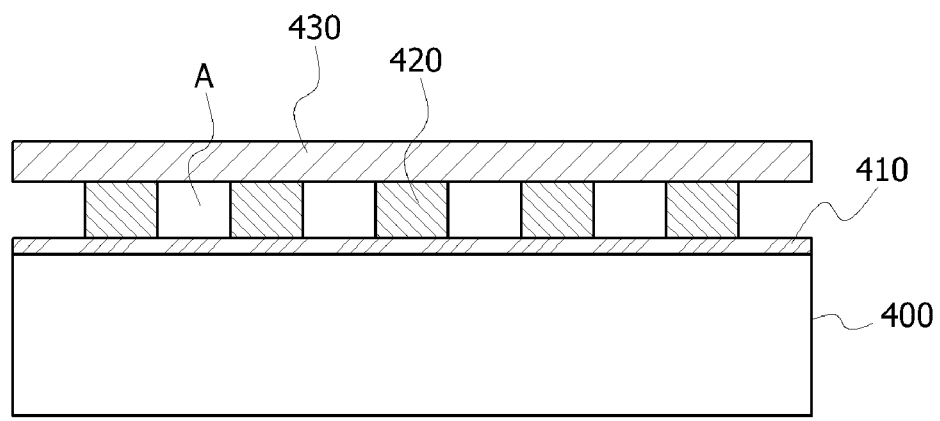
FIG. 4 is a cross-sectional view illustrating a soft magnetic layer and a receiving coil.

FIG. 4 is a cross-sectional view illustrating a soft magnetic layer and a receiving coil.

Referring to FIG. 4, an adhesive layer 410 is formed on a soft magnetic layer 400, a receiving coil 420 is formed on the adhesive layer 410, and a support film 430 is formed on the receiving coil 420. The support film 430 supports the receiving coil 420, and may include a polyethylene terephthalate (PET) material.

As described above, when the soft magnetic layer 400 and the receiving coil 420 is bonded through the adhesive layer 410, an air layer A is formed, and guiding effect of a magnetic field of the soft magnetic layer 400 may be reduced.

According to embodiments of the present invention, an air layer in a receiving antenna of a wireless power receiving device is removed and power transmission efficiency is increased.

Figure 5:
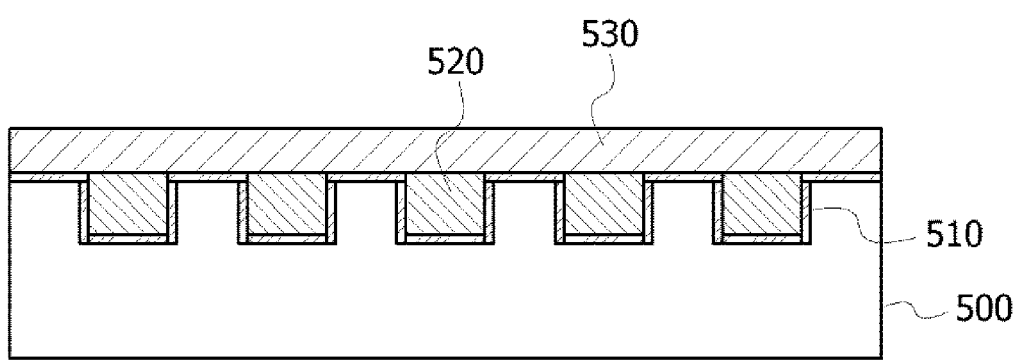
FIG. 5 is a cross-sectional view illustrating a soft magnetic layer and a receiving coil in accordance with an embodiment of the present invention.

FIG. 5 is a cross-sectional view illustrating a soft magnetic layer and a receiving coil in accordance with an embodiment of the present invention.

Referring to FIG. 5, an adhesive layer 510 is formed on a soft magnetic layer 500, a receiving coil 520 is formed on the adhesive layer 510, and a support means 530 is formed on the receiving coil 520. The support means 530 supports the receiving coil 520, and may include a polyethylene terephthalate (PET) material, and may have a form of film. Here, the receiving coil 520 may be formed inside of the soft magnetic layer 500. For example, the receiving coil 520 may be embedded in an upper surface of the soft magnetic layer 500. Accordingly, the air layer formed between the receiving coil 520 and the soft magnetic layer 500 is removed and power transmission efficiency can be increased.

For this, the soft magnetic layer 500 includes a groove portion to accommodate the receiving coil 520 inside of the soft magnetic layer 500, and may bond the receiving coil 520 in the groove portion using the adhesive layer 510.

Further, after the receiving coil 520 is disposed on the upper surface of the soft magnetic layer 500, the receiving coil 520 may be embedded inside of the soft magnetic layer 500 by compressing the soft magnetic layer 500 and the receiving coil 520. For facilitating compression and embedment of the receiving coil 520, the soft magnetic layer 500 may include sheets including a soft magnetic metal powder and a polymer resin. Specific methods will be described below.

Meanwhile, the adhesive layer 510 may have a double-sided structure including an insulating layer.

Figure 6:
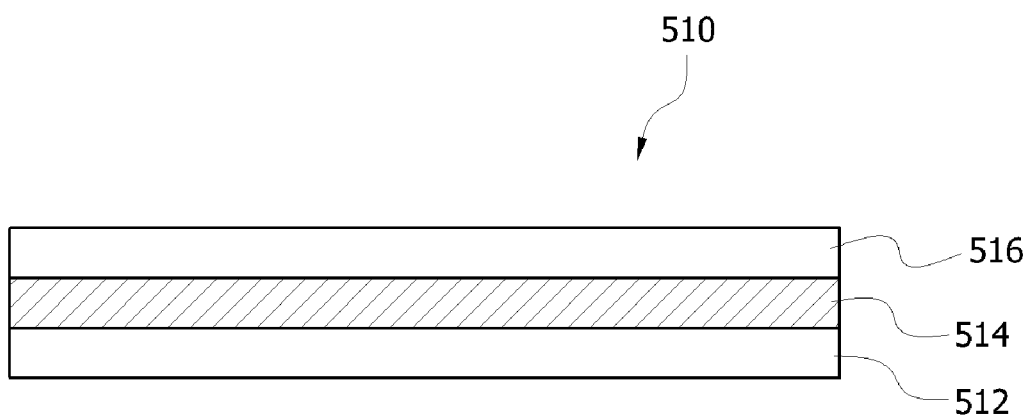
FIG. 6 is a cross-sectional view illustrating an adhesive layer in accordance with an embodiment of the present invention.

FIG. 6 is a cross-sectional view illustrating an adhesive layer in accordance with an embodiment of the present invention.

Referring to FIG. 6, the adhesive layer 510 may include a first adhesive layer 512, an insulating layer 514 formed the first adhesive layer 512, and a second adhesive layer 516 formed on the insulating layer 514.

Here, the insulating layer 514 may include, for example, a polyethylene terephthalate (PET) material. Therefore, even when the first adhesive layer 512 or the second adhesive layer 516 is broken down in the process of forming or embedding the receiving coil 520 inside of the soft magnetic layer 500, an electrical short between a metal in the soft magnetic layer 500 and the receiving coil 520 can be prevented.

Figure 7:
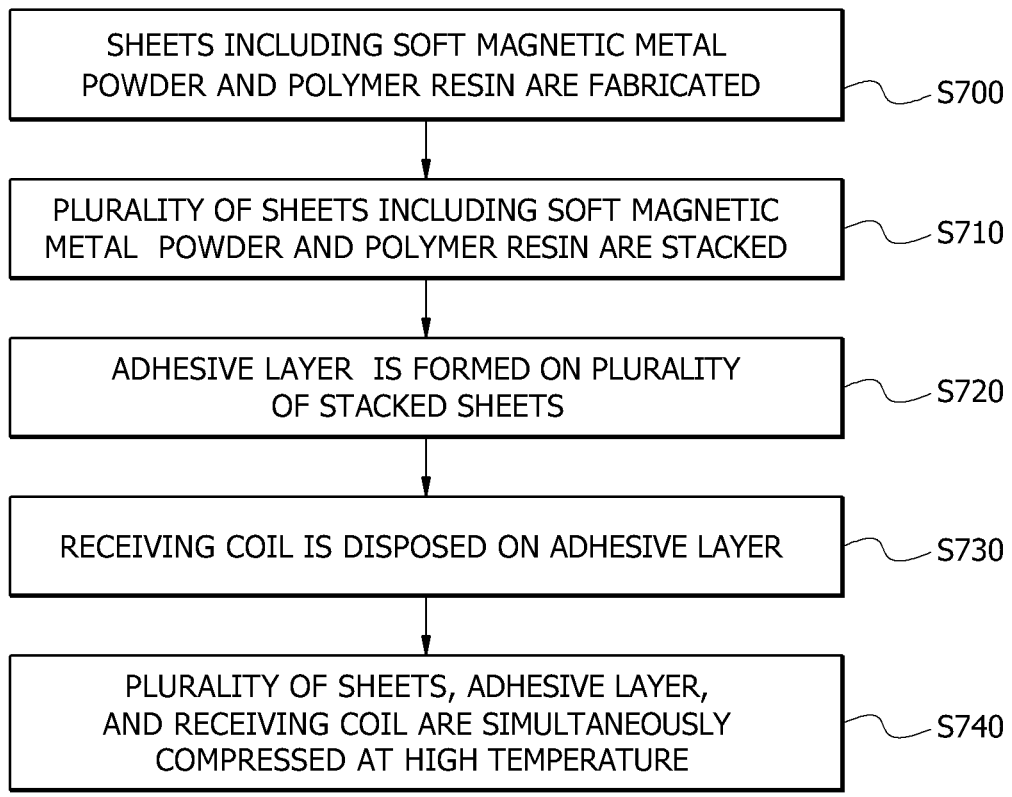
FIG. 7 is a flowchart illustrating a method of embedding a receiving coil in a soft magnetic layer in accordance with an embodiment of the present invention.

FIG. 7 is a flowchart illustrating a method of embedding a receiving coil in a soft magnetic layer in accordance with an embodiment of the present invention. Here, the soft magnetic layer is assumed to include sheets including a soft magnetic metal powder and a polymer resin.

Referring to FIG. 7, sheets including a soft magnetic metal powder and a polymer resin are fabricated (S700). For this, sheets with a thin form may be fabricated by performing film casting on ink including a solvent, a soft magnetic metal powder and a polymer resin. Here, the soft magnetic metal powder may include, for example, an Fe-silicon-based alloy. Further, the polymer resin may include, for example, at least one of a rubber-based polymer resin, an epoxy-based polymer resin, and a silicon-based polymer resin.

Next, after a plurality of sheets are stacked (S710), then an adhesive layer is formed on an upper surface of the plurality of sheets (S720), a receiving coil is disposed on the adhesive layer (S730), and the plurality of sheets, the adhesive layer, and the receiving coil are simultaneously compressed at a high temperature (S740). Here, the compression process may be performed for one to four hours at a temperature of 80 to 250° C. and at a pressure of 100 to 300 kgf/cm$^2$. Preferably, the compression process may be performed for two to three hours at a temperature of 150 to 200° C. and at a pressure of 150 to 250 kgf/cm$^2$.

As described above, when the plurality of sheets and the receiving coil are simultaneously compressed, due to mobility of the polymer resin included in the sheets, the groove portion is formed on a boundary surface between the sheets and the receiving coil, and the polymer resin permeates into a space between receiving coils and the air layer is not formed. Therefore, a problem of reducing of the guiding effect of a magnetic field due to the air layer between the receiving coil and the soft magnetic layer can be prevented.

Figure 8:
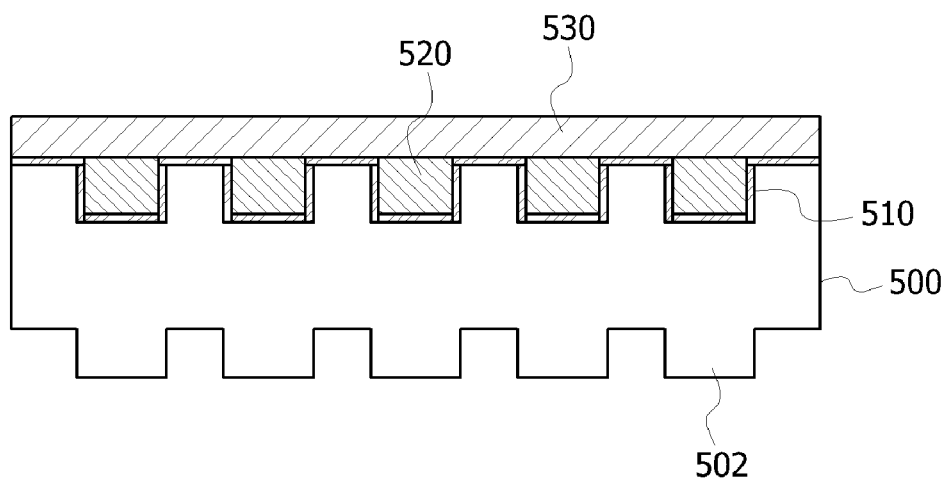
FIG. 8 is a cross-sectional view illustrating an example of disposing a receiving coil on an upper plane of a plurality of sheets and performing compression on the receiving coil after compressing the plurality of sheets at a high temperature.

On the contrary, when the plurality of sheets and the receiving coil are not simultaneously compressed, but the plurality of sheets are first compressed at a high temperature and then the receiving coil is disposed on an upper surface of the sheets and compressed again, a convexo-concave structure may be formed at a rear surface 502 of the soft magnetic layer due to a mechanical pressure difference as shown in FIG. 8. This may induce reducing of guiding of the magnetic field.

Further, the groove portion formed on a boundary surface between the sheets and the receiving coil is thermally hardened in the process of compressing at a high temperature, and therefore stable implementation is possible.

Further, the polymer resin included in the sheets becomes an insulating material having high thermal stability through compression at a high temperature, and therefore the polymer resin can perform an insulating function required between soft magnetic metal powders, and can prevent corrosion of the soft magnetic metal powders even at severe environments.

Further, as described above, when the adhesive layer is formed to have a double-sided structure including an insulating layer, an electrical short can be prevented even when a part of the adhesive layer is peeled in the process of compression of the plurality of sheets and the receiving coil at a high temperature.

Hereinafter, test results of transmission efficiency based on dispositions of the receiving coil and conditions of embedment are described.

Figure 9:
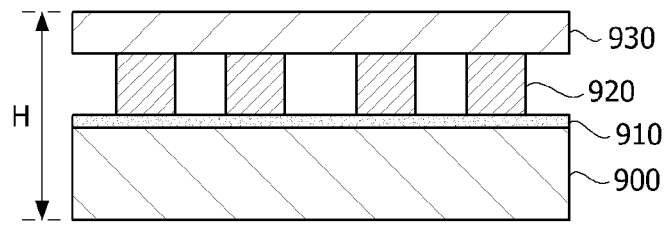
FIG. 9 is a cross-sectional view illustrating a soft magnetic layer and a receiving coil in accordance with a comparative example and an example of the present invention.
Figure 9:
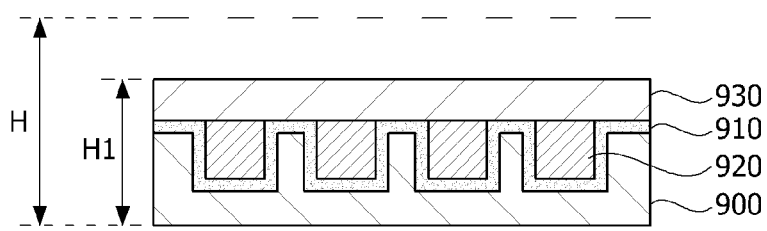
Figure 9:
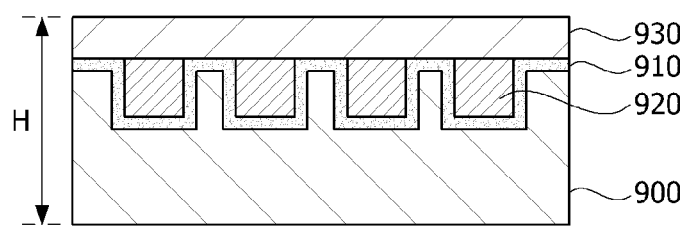
Figure 9:
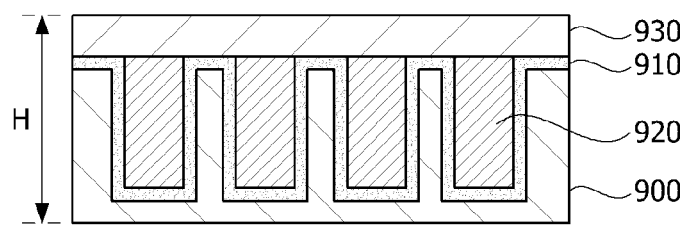
Figure 10:
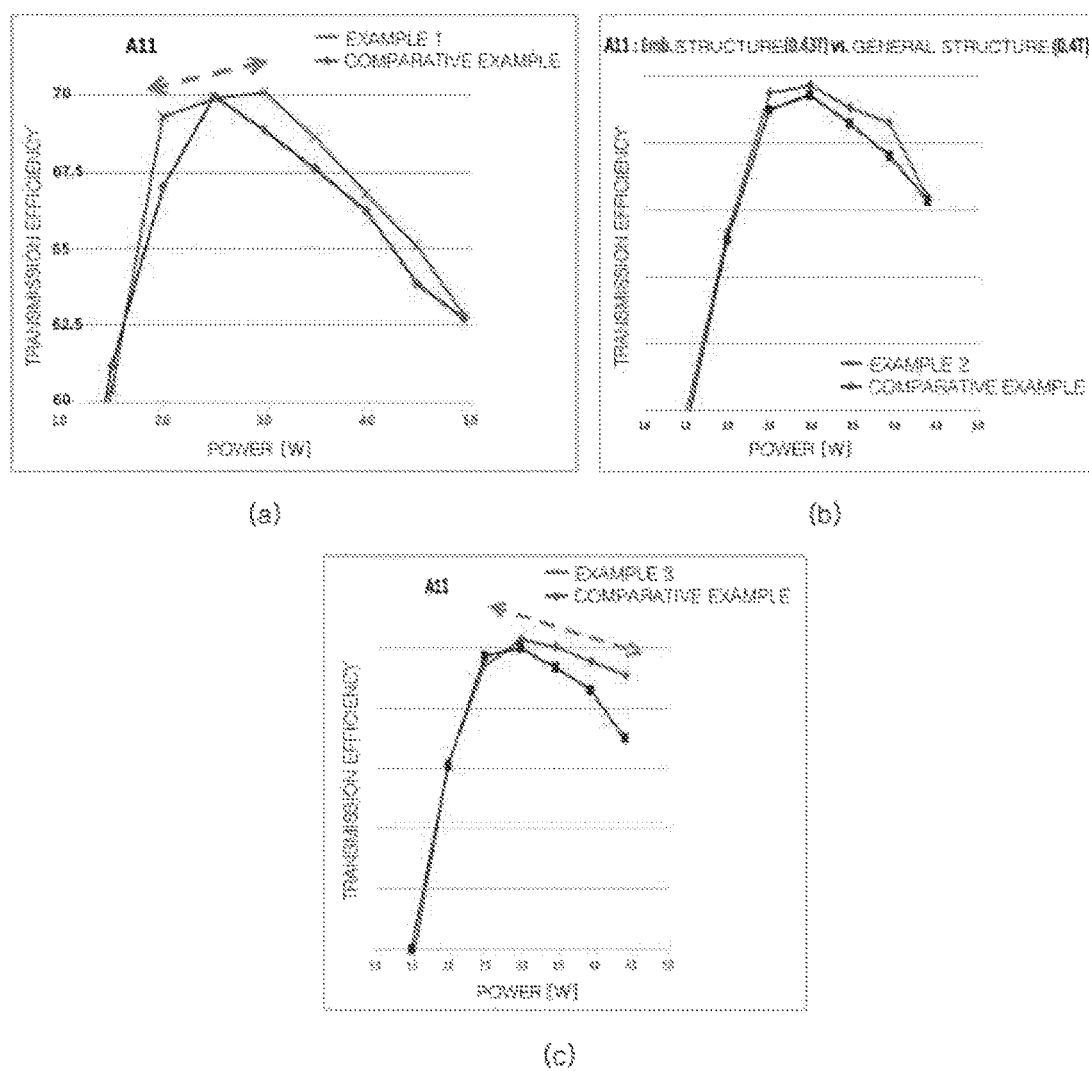
FIG. 10 is a graph illustrating a measurement result of a transmission efficiency in accordance with a comparative example and an example of the present invention.

FIG. 9 is a cross-sectional view illustrating a soft magnetic layer and a receiving coil in accordance with a comparative example and an example of the present invention, and FIG. 10 is a graph illustrating a measurement result of a transmission efficiency in accordance with a comparative example and an example of the present invention.

Referring to Comparative Example of FIG. 9A, an adhesive sheet 910 having a thickness of 0.03 mm is disposed on a magnetic sheet 900 having a thickness of 4 mm, a receiving coil 920 having a thickness of 0.13 mm is disposed on the adhesive sheet 910, and a PI film 930 having a thickness of 0.03 mm is disposed on the receiving coil 920.

Figure 11:
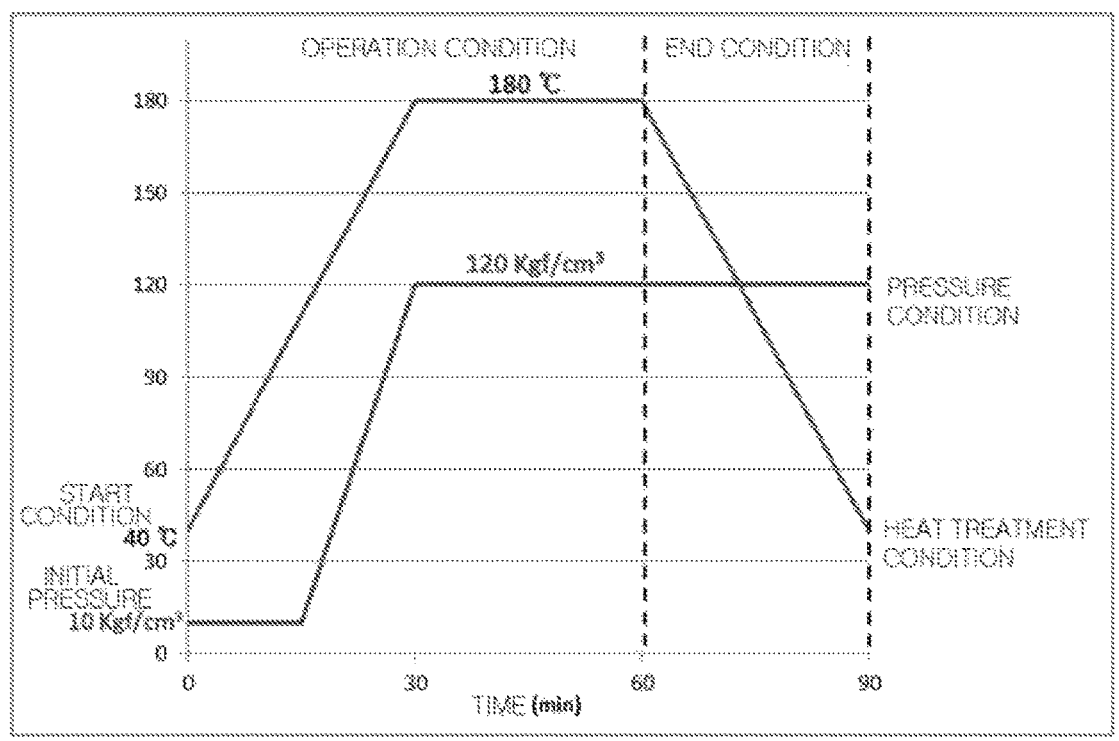
FIG. 11 is a graph illustrating a pressure condition and heat treatment condition in accordance with an embodiment of the present invention.

Referring to Example 1 of FIG. 9B, a magnetic sheet 900 having a thickness of 4 mm, an adhesive sheet 910 having a thickness of 0.03 mm, a receiving coil 920 having a thickness of 0.13 mm, and a PI film 930 having a thickness of 0.03 mm are sequentially stacked, and the receiving coil 920 is embedded in the magnetic sheet 900. As shown in Example 1 of FIG. 9B, to embed the receiving coil 920 in the magnetic sheet 900, one sheet of aluminum duo-foil with 1.2 mmT, one sheet of a lower cover (FR-25DM), a structure of Comparative Example of FIG. 9A, one sheet of an upper cover (FR-250M), one sheet of aluminum foil with 1.2 mmT, two sheets of PVC with 520 mm*360 mm and 1.2 mmT (for high temperature), two sheets of kraft with 530 mm*420 mm, one sheet of aluminum duo-foil with 1.2 mmT are sequentially stacked, and then heat treatment and compression are performed according to conditions of FIG. 11.

Referring to Example 2 of FIG. 9C, a magnetic sheet 900 having a thickness of 4.3 mm, an adhesive sheet 910 having a thickness of 0.03 mm, a receiving coil 920 having a thickness of 0.13 mm, and a PI film 930 having a thickness of 0.03 mm are sequentially stacked, and the receiving coil 920 is embedded in the magnetic sheet 900.

Referring to Example 3 of FIG. 9D, a magnetic sheet 900 having a thickness of 4 mm, an adhesive sheet 910 having a thickness of 0.03 mm, a receiving coil 920 having a thickness of 0.16 mm, and a PI film 930 having a thickness of 0.03 mm are sequentially stacked, and the receiving coil 920 is embedded in the magnetic sheet 900.

FIG. 9B has a thickness of 0.56 mm, and is thinner than FIG. 9A having a thickness of 0.59 mm. Each of cross-sections of FIG. 9C and FIG. 9D is 0.59 mm, and is fabricated with the same thickness as FIG. 9A.

Referring to FIG. 10A which compares transmission efficiency of Comparative Example and Example 1, a section showing high efficiency (Max %) according to Example 1 is broader compared with Comparative Example. Accordingly, it can be noted that the transmission efficiency of Example 1 is higher than that of Comparative Example.

Referring to FIG. 10B which compares transmission efficiency of Comparative Example and Example 2, the transmission efficiency of Example 2 is similar to that of Comparative Example. However, in Example 2, the magnetic sheet is thick and therefore magnetic shielding effect may increase.

Referring to FIG. 10C which compares transmission efficiency of Comparative Example and Example 3, it can be noted that the transmission efficiency of Example 3 is excellent compared with that of Comparative Example. Particularly, in Example 3, as a driving power becomes higher, a drop phenomenon of the transmission efficiency becomes decreased.

This written description sets forth the best modes of the invention. It will be understood by those skilled in the art that various modifications can be made without departing from the scope of the present invention and without changing essential features.

The invention claimed is:

1. A wireless power receiving device comprising:
   a substrate;
   a soft magnetic layer comprising a first soft magnetic sheet disposed on the substrate and a second soft magnetic sheet disposed on the first soft magnetic sheet;
   a coil member comprising a receiving coil and an NFC coil stacked on the second soft magnetic sheet; and
   an adhesive layer formed between the second soft magnetic sheet and the coil member and including a first adhesive layer formed on the second soft magnetic sheet, an insulating layer formed on the first adhesive layer, and a second adhesive layer formed on the insulating layer,
   wherein the receiving coil is wound in parallel with a plane of the soft magnetic layer, and the NFC coil is disposed to surround an outer portion of the receiving coil,
   wherein the first adhesive layer directly contacts with the second soft magnetic sheet, the second adhesive layer directly contacts with the coil member, and the insulating layer is disposed between the first adhesive layer and the second adhesive layer, wherein a portion of the coil member is embedded in one surface of the second soft magnetic sheet, and wherein a height of a highest position of the second soft magnetic sheet from the substrate is higher than a height of a lowest position of the coil member from the substrate.

2. The wireless power receiving device of claim 1, wherein the insulating layer is a film including a polyethylene terephthalate (PET) material.

3. The wireless power receiving device of claim 1, wherein the soft magnetic layer includes a soft magnetic metal powder and a polymer resin.

4. The wireless power receiving device of claim 1, wherein the soft magnetic layer includes an Fe based alloy.

5. The wireless power receiving device of claim 4, wherein the soft magnetic layer includes an Fe-silicon based alloy.

6. The wireless power receiving device of claim 1, further comprising a film stacked on the coil member.

7. A wireless power receiving device comprising:
a substrate;
a soft magnetic layer comprising a first soft magnetic sheet disposed on the substrate and a second soft magnetic sheet disposed on the first soft magnetic sheet;
a coil member comprising a wireless charging coil disposed on the second magnetic sheet and an NFC coil disposed so as to surround the wireless charging coil; and
an adhesive layer disposed between the second soft magnetic sheet and the coil member;
wherein the wireless charging coil and the NFC coil respectively includes coil patterns formed by a plurality of turns,
wherein the adhesive layer includes a first adhesive layer which directly contacts with the second soft magnetic sheet, a second adhesive layer which directly contacts with the coil member and an insulating layer disposed between the first adhesive layer and the second adhesive layer,
wherein a portion of the second adhesive layer is disposed on a side of the coil patterns.

8. The wireless power receiving device of claim 7, wherein a portion of the second adhesive layer is embedded in one surface of the second soft magnetic sheet.

9. The wireless power receiving device of claim 8, wherein a height of a highest position of the second adhesive layer from the substrate is higher than a height of a highest position of the second soft magnetic sheet from the substrate.

10. The wireless power receiving device of claim 7, wherein the soft magnetic layer includes an Fe based alloy.

11. The wireless power receiving device of claim 7, wherein the soft magnetic layer includes an Fe-silicon based alloy.

12. The wireless power receiving device of claim 7, further comprising a film stacked on the coil member.

13. A wireless power receiving device comprising:
a substrate;
a soft magnetic layer comprising a first soft magnetic sheet disposed on the substrate and a second soft magnetic sheet disposed on the first soft magnetic sheet;
a coil member comprising a wireless charging coil disposed on the second magnetic sheet and an NFC coil disposed so as to surround the wireless charging coil;
a film disposed on a first surface of the coil member; and
an adhesive layer disposed between the second soft magnetic sheet and the coil member;
wherein the adhesive layer includes a first adhesive layer which directly contacts with the second soft magnetic sheet, a second adhesive layer which directly contacts with a second surface which is opposite to the first surface of the coil member, and an insulating layer disposed between the first adhesive layer and the second adhesive layer, and
wherein a height of a highest position of the coil member from the film is higher than a height of a lowest position of the second soft magnetic sheet from the film.

14. The wireless power receiving device of claim 13, wherein the soft magnetic layer includes an Fe based alloy.

15. The wireless power receiving device of claim 14, wherein the soft magnetic layer includes an Fe-silicon based alloy.

16. A portable terminal, comprising:
a substrate;
a soft magnetic layer comprising a first soft magnetic sheet disposed on the substrate and a second soft magnetic sheet disposed on the first soft magnetic sheet;
a coil member comprising a receiving coil and an NFC coil stacked on the second soft magnetic sheet;
an adhesive layer formed between the second soft magnetic sheet and the coil member and including a first adhesive layer formed on the second soft magnetic sheet, an insulating layer formed on the first adhesive layer, and a second adhesive layer formed on the insulating layer;
a circuit unit connected to the coil member, and configured to convert electromagnetic energy into electrical energy; and
a storage unit configured to store the electrical energy,
wherein the receiving coil is wound in parallel with a plane of the soft magnetic layer, and the NFC coil is disposed to surround an outer portion of the receiving coil,
wherein the first adhesive layer directly contacts with the second soft magnetic sheet, the second adhesive layer directly contacts with the coil member, and the insulating layer is disposed between the first adhesive layer and the second adhesive layer,
wherein a portion of the coil member is embedded in one surface of the second soft magnetic sheet, and
wherein a height of a highest position of the second soft magnetic sheet from the substrate is higher than a height of a lowest position of the coil member from the substrate.

17. The portable terminal of claim 16, wherein the soft magnetic layer includes an Fe based alloy.

18. The portable terminal of claim 17, wherein the soft magnetic layer includes an Fe-silicon based alloy.

19. The portable terminal of claim 17, further comprising a film stacked on the coil member.

* * * * *